J. SCHEEN
Velocipede.
No 63,433.
Patented Apr. 2. 1867
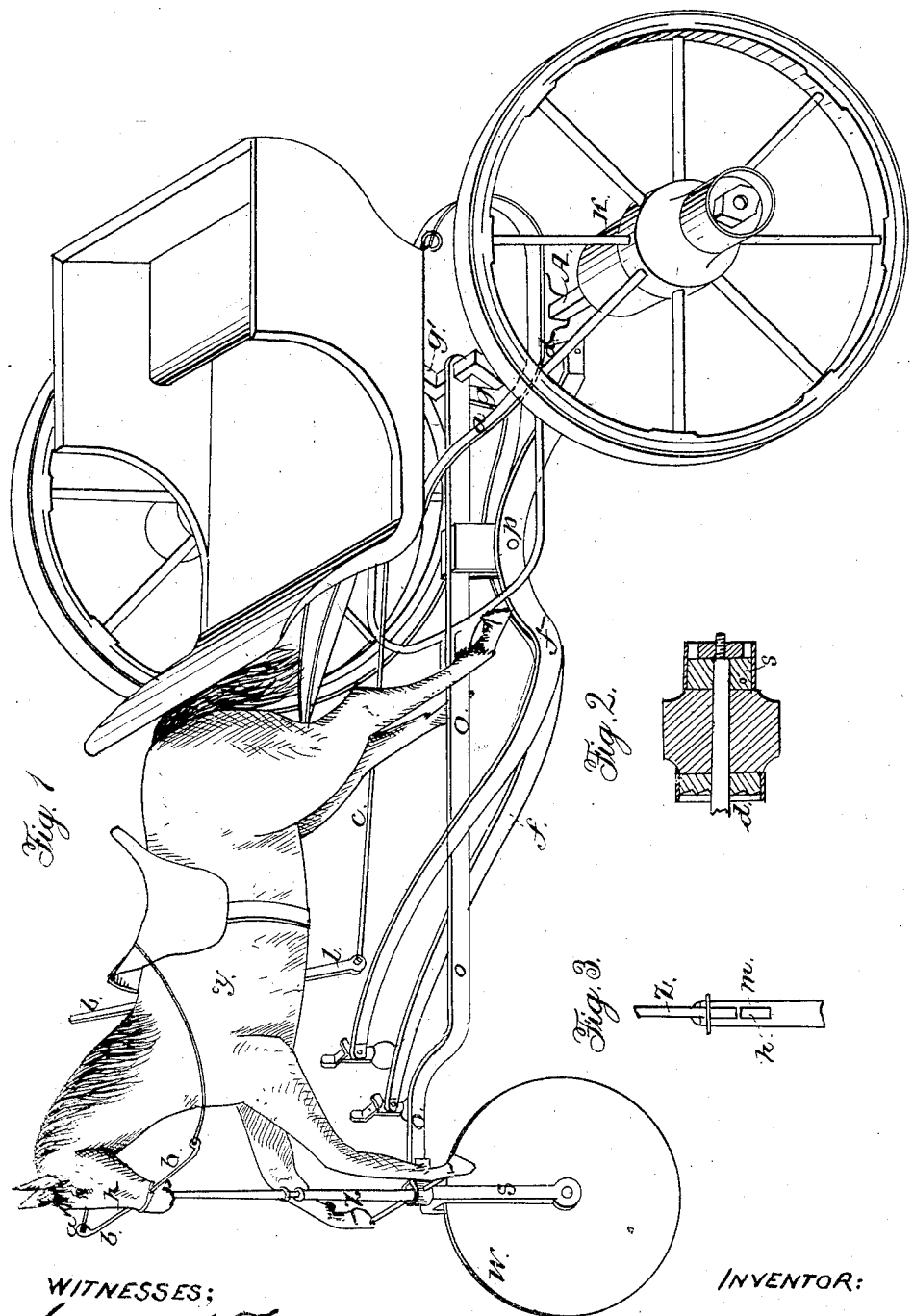
WITNESSES:
Julius A. Fay
Chas. M. Fay
INVENTOR:
Joseph Scheen, by
Brown & Bradle, Attys

United States Patent Office.

JOSEPH SCHEEN, OF NEW HAVEN, CONNECTICUT.

Letters Patent No. 63,433, dated April 2, 1867.

IMPROVEMENT IN BABY CARRIAGE AND VELOCIPEDE.

*The Schedule referred to in these Letters Patent and making part of the same.*

TO ALL WHOM IT MAY CONCERN:

Be it known that I, JOSEPH SCHEEN, of New Haven, in the county of New Haven, and State of Connecticut, have invented a new and improved Baby Carriage and Velocipede; and I do hereby declare that the following is a full and exact description thereof, reference being had to the accompanying drawings, and to the letters of reference marked thereon. In the drawings—

Figure 1 is a perspective view.

Figure 2, a sectional view of the wheel and axle; and

Figure 3 a vertical section of the lower part of rod $z$ and its connection with the wheel post.

My invention consists in a combination of the velocipede and baby carriage for children's use.

$ff$ are levers moving freely upon the point $p$, and connecting with the short arms $a$ attached to the cranks $g\ g'$ upon the axle A. These cranks are placed at right angles to each other, in order that the power may be applied by depressing each lever alternately. When the levers, however, are at dead-points, and no power can be applied by them, the hand-lever $l$ is used. This lever, pivoted at the point $y$, connected by the rod $c$, is joined to one of the arms $a$ out of the right line of the cranks $g\ g'$. To obviate difficulty in turning, ratchets $d$ and rubber springs $s$, fig. 2, are used. It is evident that, as wheels are ordinarily fixed upon such axles, they must hitch in turning, for the inner wheel of the circle will turn with the axle, while the outer wheel, having much more ground to go over, must turn much faster, or else it must be dragged. My invention entirely obviates this difficulty. By placing ratchets upon the wheel and axle, and rubber springs within the hub, one wheel is allowed to turn faster than the other without dragging, for the weight of the carriage forcing the wheel to turn rapidly, the rubber springs are compressed, the ratchets uncoupled, and free movement is thus allowed. $z$ represents the guiding post, held in position by the main bar $o$, and inserted into the horse's head $h$ in such a manner as to turn freely. It is provided with a cross-bar, $b$, to which reins are attached for the purpose of moving the post, and thus giving direction at the will of the rider. The guiding post, at its lower end, has a socket containing a rubber spring. In this the wheel post $s$ is inserted, and secured in its place by a pin. This arrangement eases the shock arising from riding over rough ground.

From this description the operation of my invention is evident: The child having been seated in the saddle, places his feet on the rests at the ends of the levers $ff$. If the cranks are at dead-point, he seizes the hand-lever $l$, and pushes or pulls, as the case may be, and thus communicates motion to the axle. When once in motion, he depresses each foot alternately. By the reins he is enabled to turn the wheel, and thus proceed in any direction he may desire. The use of ratchets and rubber springs allows him to turn freely in any direction without dragging or hitching, as must be the case in carriages without this arrangement.

What I claim, and desire to secure by Letters Patent, is—

1. The upright $z$, with its socket $m$ and rubber spring $n$, or equivalent, in combination with the guiding wheel $w$, as set forth.

2. The combination of the levers $f$, cranks $g$, ratchets $d$, and wheels $k$, when constructed and arranged substantially as described.

JOSEPH SCHEEN.

Witnesses:
 JOHN TINKEY,
 FREDK. C. ROWLAND.